(12) United States Patent
Beswick et al.

(10) Patent No.: US 11,420,890 B2
(45) Date of Patent: Aug. 23, 2022

(54) METHOD OF TREATMENT OF PARTIALLY HYDROLYZED BIOSOLIDS

(71) Applicant: Lystek International Corp., Cambridge (CA)

(72) Inventors: Michael Beswick, Guelph (CA); Ajay Singh, Morriston (CA)

(73) Assignee: Lystek International Corp., Cambridge (CA)

( * ) Notice: Subject to any disclaimer, the term of this patent is extended or adjusted under 35 U.S.C. 154(b) by 2 days.

(21) Appl. No.: 17/118,772

(22) Filed: Dec. 11, 2020

(65) Prior Publication Data
US 2021/0179469 A1 Jun. 17, 2021

Related U.S. Application Data

(60) Provisional application No. 62/947,184, filed on Dec. 12, 2019.

(51) Int. Cl.
| | |
|---|---|
| *C02F 11/04* | (2006.01) |
| *C02F 11/12* | (2019.01) |
| *C02F 11/18* | (2006.01) |

(52) U.S. Cl.
CPC .............. *C02F 11/04* (2013.01); *C02F 11/12* (2013.01); *C02F 11/18* (2013.01); *C02F 2209/02* (2013.01); *C02F 2209/09* (2013.01); *C02F 2209/14* (2013.01); *C02F 2209/44* (2013.01); *C02F 2303/06* (2013.01); *C02F 2303/10* (2013.01); *C02F 2305/06* (2013.01); *Y02W 10/20* (2015.05)

(58) Field of Classification Search
CPC ........... C02F 11/04; C02F 11/12; C02F 11/18; C02F 2209/02; C02F 2209/09; C02F 2209/14; C02F 2209/44; C02F 2303/06; C02F 2303/10; C02F 2305/06; Y02W 10/20
USPC .......................... 210/603, 609, 612, 613, 903
See application file for complete search history.

(56) References Cited

U.S. PATENT DOCUMENTS

| | | |
|---|---|---|
| 6,808,636 B2 | 10/2004 | Ward et al. |
| 7,736,511 B2 | 6/2010 | Lugowski et al. |
| 8,011,605 B2 | 9/2011 | Ward et al. |

(Continued)

FOREIGN PATENT DOCUMENTS

| | | |
|---|---|---|
| WO | 2018227304 A1 | 12/2018 |
| WO | 2019018935 A1 | 1/2019 |
| WO | 2019195928 A1 | 10/2019 |

*Primary Examiner* — Fred Prince

(57) ABSTRACT

A method of processing enhanced biosolids from a wastewater treatment plant to produce an output mixture. The method includes providing one or more volumes of an input mixture that has an input mixture viscosity. The input mixture includes the enhanced biosolids, which have been subjected to shear forces and mixed in a mixing vessel. The enhanced biosolids are partially hydrolyzed biosolids with an input solids content between 4% and 16% by weight of the input mixture. The input mixture also includes sufficient process liquid to result in the output mixture having an output solids content between 3% and 13% by weight of the output mixture. The input mixture is stored in a storage vessel in which the input mixture is subjected to anaerobic conditions and hydrolysis over a predetermined tie period, to form the output mixture having an output mixture viscosity that is less than the input mixture viscosity.

7 Claims, 2 Drawing Sheets

(56) References Cited

U.S. PATENT DOCUMENTS

| | | | |
|---|---|---|---|
| 8,349,184 B2 | 1/2013 | Ward et al. | |
| 9,139,483 B2 | 9/2015 | Ward et al. | |
| 9,260,322 B2 | 2/2016 | Ward et al. | |
| 9,504,969 B2 | 11/2016 | Ward et al. | |
| 10,196,293 B2 | 2/2019 | Ward | |
| 2011/0091953 A1* | 4/2011 | Bolin | C10L 3/08 |
| | | | 44/605 |
| 2014/0137615 A1* | 5/2014 | Ward | C05F 3/00 |
| | | | 210/663 |
| 2016/0214879 A1* | 7/2016 | Josse | C02F 11/04 |
| 2020/0062629 A1* | 2/2020 | Theodoulou | C02F 11/18 |
| 2020/0123074 A1 | 4/2020 | Ward | |

* cited by examiner

METHOD OF TREATMENT OF PARTIALLY HYDROLYZED BIOSOLIDS

CROSS-REFERENCE TO RELATED APPLICATION

This application claims the benefit of U.S. Provisional Application No. 62/947,184, filed on Dec. 12, 2019, the entirety of which provisional application is hereby incorporated herein by reference.

FIELD OF THE INVENTION

The present invention is a method of treatment of partially hydrolyzed biosolids.

BACKGROUND OF THE INVENTION

In the prior art, raw sewage is treated in a municipal wastewater treatment plant (MWWTP), to at least partially remove contaminants (e.g., pathogens, and other organic and inorganic materials), and to retrieve water from the wastewater influent streams. Initially, the raw sewage may include, e.g., between approximately 95% to 99.5% by weight water, and approximately 0.5% to 5% by weight solids. Conventional processing in the MWWTP may include anaerobic digestion.

Typically, a large proportion of the water is removed from the wastewater influent stream for recycling and reprocessing. Substantial water is removed by processes such as flocculation and settling to form sewage sludge, which is moist. Use of dewatering equipment such as filters and centrifuges produces a drier cake-like product conventionally referred to as biosolids cake.

The raw sewage is processed as described above in order to achieve a number of objectives efficiently, including reducing the volume of waste material and liquid that is required to be disposed of, upon the products resulting from such processing exiting the treatment plant. The biosolids cake may include between about 15% and 35% solids by weight of the biosolids cake. The biosolids cake typically has gel-like characteristics. Because the biosolids cake tends to adhere to surfaces, the biosolids cake can be difficult to handle.

The sewage sludge is subjected to anaerobic digestion in the MWWTP. Anaerobic digestion of sewage sludge occurs when oxygen is limited. A proportion of the volatile solids or organics is biologically converted to biogas (e.g., methane). Anaerobic microbes, particularly methanogens, which are capable of converting organic components to methane and other biogases, are key to treating the sewage sludge so that it becomes a more stabilized sludge with reduced solids, and a reduced pathogen load.

Typically, in a continuous process, sludge solids concentration in MWWTP mesophilic anaerobic digesters is about 2% to 3% by weight. Higher solids concentrations in anaerobic digesters may sometimes lead to poor mixing performance and lower activity of the anaerobic microorganisms, and eventually lead to low biogas yields. Typical anaerobic digester processes also require significant acclimatization periods during startup, as they rely on acidogens to generate volatile fatty acids for conversion to methane by methanogens.

Microbial populations are specifically adapted to ideal temperatures for their optimal growth and kinetics. Conventional mesophilic anaerobic digesters in the MWWTP operate at 35° C.-37° C., which is optimal for mesophilic methane-producing organisms. The effluent from the anaerobic digester typically includes about 2-3% solids.

Biosolids disposal represents a major portion (e.g., 40% to 60%) of the costs incurred in connection with operating a municipal wastewater treatment plant. The biosolids cake may be disposed of, for example, by land application as Class B or Class A biosolids (classified according to United States Environmental Protection Agency regulations), incinerated, heat dried, or disposed of in landfills. However, utilizing biosolids for beneficial applications within the MWWTP is generally an effective solution.

Some of the known biosolids disposal methods involve further processing, before or after the biosolids exit the MWWTP. For example, further processing may be implemented to reduce the viscosity of the biosolids cake (i.e., for easier handling). To reduce the viscosity of the biosolids cake, hydrolysis may be utilized, either before or after the biosolids cake has exited the MWWTP, to break down the viscous polymeric substances including proteins, carbohydrates, nucleic acid-containing polymers and other complex polymers. Alkali and heat promotes hydrolysis of the viscous polymeric substances in biosolids. Also, rates of hydrolysis increase with increasing temperature.

The further processing may be intended to convert the biosolids cake into a fertilizer product. Alternatively, instead of being processed to form a fertilizer product, the biosolids cake that is enhanced by further processing to make them more digestible can be used to feed the anaerobic digesters in the MWWTP, to improve biogas yields in those digesters. Such processed or enhanced biosolids cake may also be utilized in a biological nutrient removal (BNR) system in the MWWTP, as a carbon source, and thereby substitute for relatively expensive chemicals that may be added into the BNR system, such as methanol and glycerol.

Utilizing the processed or enhanced biosolids cake within the MWWTP has the advantage that the processed biosolids do not have to be transported and managed outside of the MWWTP.

It is known in the prior art to subject the biosolids cake to pretreatment (i.e., further processing) before introducing the enhanced, or further processed, biosolids into the anaerobic digester in the MWWTP. The conventional pretreatment or further processing involves conventional thermal hydrolysis processes, which require high temperature (e.g., about 150° C.) and high pressure (greater than 100 psi) in specialized pressure vessels.

Accordingly, the known methods of further processing the biosolids cake have the disadvantage that they typically involve significant additional costs. In addition, in the known methods of further processing, significant portions of the polymeric substances typically are not hydrolyzed, i.e., the biosolids typically are only partially hydrolyzed.

As a result, in the prior art, only a limited proportion (e.g., usually between 30% and 50% of the generated total) of the enhanced biosolids that has been subjected to further processing may be utilized in anaerobic digesters, or in the BNR, in the MWWTP. This is because a significant proportion of the enhanced biosolids is inert fraction biosolids (also referred to as inorganic solids), that is, a significant proportion of the enhanced biosolids has not been hydrolyzed by the further processing.

SUMMARY OF THE INVENTION

For the foregoing reasons, there is a need for a method of treating partially hydrolyzed biosolids that mitigates or overcomes the disadvantages or defects of the prior art.

In its broad aspect, the invention provides a method of processing enhanced biosolids from a wastewater treatment plant to produce an output mixture. The method includes providing one or more volumes of an input mixture that has an input mixture viscosity. The input mixture includes the enhanced biosolids, which have been subjected to shear forces and mixed in a mixing vessel. The enhanced biosolids are partially hydrolyzed biosolids with an input solids content between 4% and 16% by weight of the input mixture. The input mixture also includes sufficient process liquid to result in the output mixture having an output solids content between 3% and 13% by weight of the output mixture.

The input mixture is stored in a storage vessel in which the input mixture is subjected to anaerobic conditions and hydrolysis over a predetermined time period, to form the output mixture having an output mixture viscosity that is less than the input mixture viscosity. The output solids content of the output mixture is between 3% and 13% by weight of the output mixture.

BRIEF DESCRIPTION OF THE DRAWINGS

The invention will be better understood with reference to the attached drawings, in which.

DETAILED DESCRIPTION

Figure 1:
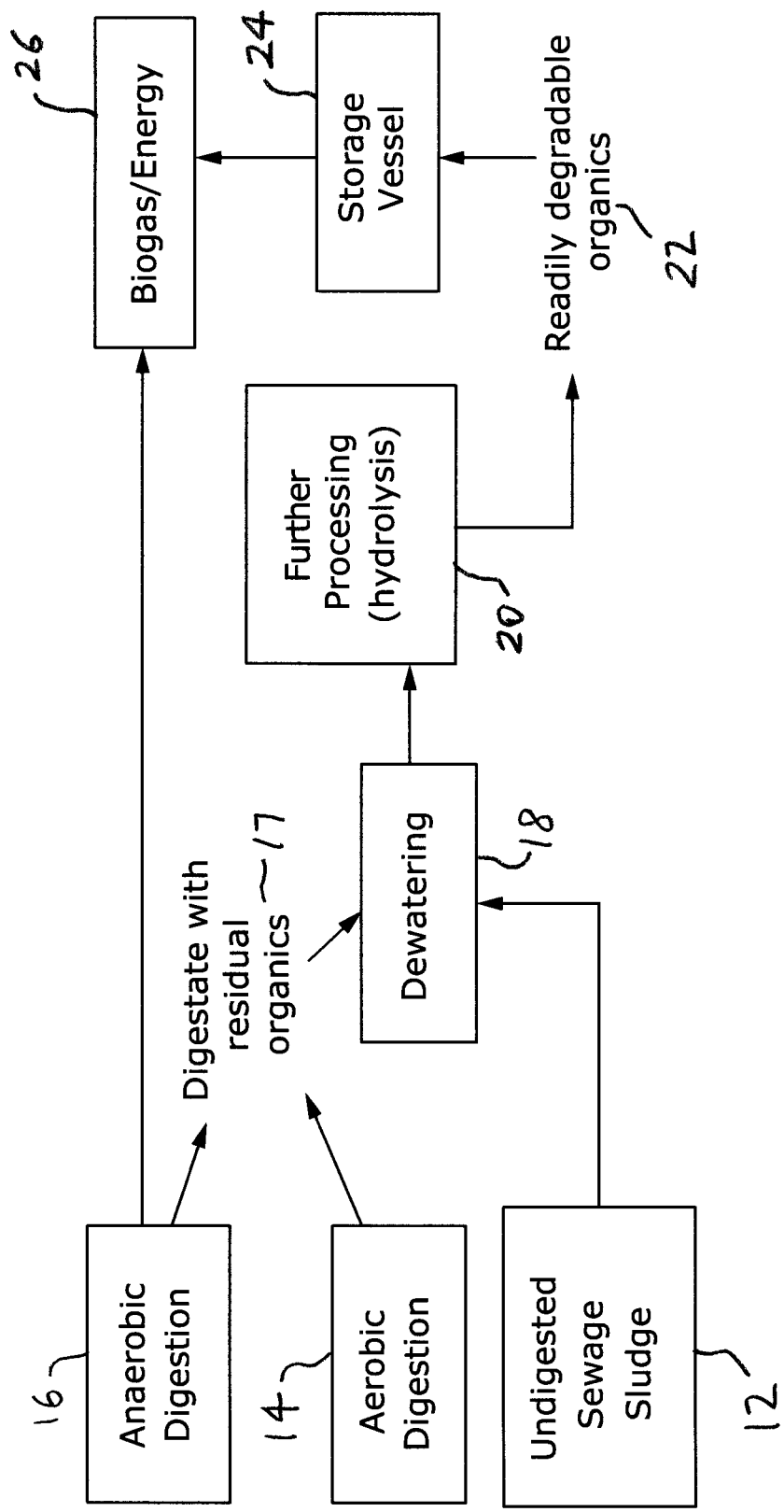
FIG. 1 is a schematic illustration showing an embodiment of a method of the invention.

In the attached drawings, like reference numerals designate corresponding elements throughout. Reference is first made to FIG. 1 to describe an embodiment of a method of processing enhanced biosolids in accordance with the invention. As will be described, the method is for producing an output mixture.

In one embodiment, one or more volumes of an input mixture are provided. The input mixture preferably includes enhanced biosolids, which are produced from further processing of biosolids cake. As will be described, the input mixture has an input mixture viscosity. In one embodiment, the enhanced biosolids are produced by a process in which the biosolids are subjected to shear forces and mixed in a mixing vessel. The enhanced biosolids are partially hydrolyzed biosolids included in an input solids content of the input mixture. The input solids content may be, for example, between approximately 4% and approximately 16% by weight of the input mixture. It is also preferred that the input mixture includes sufficient process liquid to result in the output mixture having an output solids content between approximately 3% and approximately 13% by weight of the output mixture.

The method of the invention preferably includes storing the input mixture in a storage vessel 24 (FIG. 1) in which the input mixture is subjected to anaerobic conditions, and also to hydrolysis, over a predetermined time period, to form the output mixture. The output mixture has an output solids content. Preferably, the output mixture has between approximately 3% and 13% output solids content by weight of the output mixture. As will also be described, the output mixture has an output mixture viscosity that is less than the input mixture viscosity.

As noted above, the enhanced biosolids are produced by further processing of the biosolids cake that is itself the product of the conventional processing to which raw sewage is subjected in a municipal wastewater treatment plant. Accordingly, input solids content between approximately 4% and approximately 16% and a relatively high pH of the input mixture (i.e., between approximately 8.5 and approximately 9.5) result from the further processing of the biosolids cake, to produce the enhanced biosolids.

Due to the further processing, the input mixture may have an input mixture viscosity that is between approximately 2,000 centipoise and approximately 15,000 centipoise. The output mixture viscosity is less than the input viscosity. The output mixture viscosity may be between approximately 1,000 centipoise and approximately 10,000 centipoise.

The further processing that produces the enhanced biosolids may be any such processing of the biosolids cake that results in partial hydrolysis of the solids. For example, the biosolids cake may be further treated, as disclosed in U.S. Pat. No. 6,808,636, by subjecting the biosolids cake to a thermal-alkaline hydrolysis process, to provide a material that is highly digestible or biodegradable. For the purposes hereof, the processes disclosed in U.S. Pat. No. 6,808,636 are collectively referred to herein as the "Lystek process". The biosolids cake is mixed by a mixing device and subjected to high shear forces while it is mixed. U.S. Pat. No. 6,808,636 is hereby incorporated herein by reference.

Without wishing to be bound by any theory, it is believed that the enhanced biosolids in the input mixture, which is subjected to anaerobic conditions in the storage vessel, also continues to be subjected to hydrolysis (e.g., the Lystek process, in whole or in part) in the storage vessel over the predetermined time period. Surprisingly, it has been found that while the enhanced biosolids are subjected to anaerobic conditions over an extended period of time (i.e., the predetermined time period) in the storage vessel, the enhanced biosolids are subjected to anaerobic digestion. This has been found to take place even though the storage vessel preferably does not include a mixing apparatus, as will be described. As noted above, the enhanced biosolids are also subjected to hydrolysis in the storage vessel.

At this point, the mechanisms involved in the processes that take place in the storage vessel are not well understood. The hydrolysis to which the input mixture is subjected in the storage vessel is believed to be at least partially due to the alkali remaining in the input mixture, from the Lystek process (or similar hydrolysis-promoting processes to which the biosolids are subjected before the input mixture is placed in the storage vessel), and may also be due to an amount of residual thermal energy that may remain in the input mixture from such hydrolysis-promoting processes, when the input mixture is introduced into the storage vessel.

For example, when the input mixture is first input into the storage vessel, the input mixture may have an input temperature at that time of between approximately 75° C. and approximately 85° C. However, it is believed that the thermal energy in the input mixture in the storage vessel dissipates over time, unless additional volumes of the input mixture are introduced into the storage vessel.

As will be described, it is also believed that, when additional volumes of the input mixture are added into the storage vessel, such additional volumes bring additional alkali and thermal energy into the storage vessel, which are added to the mixture already in the storage vessel.

As noted above, there are anaerobic conditions in the storage vessel. Surprisingly, it appears that anaerobic digestion is achieved in the storage vessel in the absence of the energy inputs typically required in connection with conventional anaerobic digesters, e.g., energy inputs to cause a mixing device to rotate in the tank, or energy inputs to cause bubbles of gas or gases to move through the mixture in the storage vessel. In addition, although it is not clear at this time how the mixing takes place in the storage vessel, it is believed that there is some mixing therein.

It will be understood that the predetermined time period over which the input mixture is subjected to anaerobic digestion and to hydrolysis in the storage vessel preferably is an extended period of time. It is believed that, even if the predetermined time period is more than 60 days, the method of the invention provides beneficial results. In an alternative embodiment, the predetermined time period is greater than 90 days.

The input mixture has an input volatile solids content of the input solids content, and the output mixture has an output volatile solids content of the output solids content. Those skilled in the art would appreciate that the output volatile solids content of the output solids content is less than the input volatile solids content of the input biosolids content. For example, in one embodiment, the input volatile solids content may be between approximately 2.5% and approximately 10% by weight of the input mixture, and the output volatile solids content may be between approximately 1.5% and approximately 7% by weight of the output mixture.

As noted above, after the biosolids cake has been subjected to the Lystek process (i.e., to produce enhanced biosolids from the biosolids cake), the enhanced biosolids cake includes a certain proportion of inert fraction biosolids, or inorganic solids. It has been found that the output mixture has an output inert fraction of the output biosolids content that is approximately the same as an input inert fraction of the input biosolids content of the input mixture. As an example, the inert solids may represent between approximately 1.5% and approximately 6% by weight of each of the input mixture and the output mixture respectively.

The anaerobic digestion and the hydrolysis in the storage vessel of the input mixture result in degradation of a significant proportion of the input volatile solids content of the input solids content, or a significant proportion thereof, over the predetermined time period. This means that the fraction of the solids content that is not degradable (or at least not easily degradable) by conventional anaerobic digestion (i.e., the volatile fraction of the input solids content) is further digestible by the method of the invention. The decrease in the volatile fraction of the total solids results in the increase of inert solids proportionately in the output mixture in the storage vessel.

As noted above, thermal energy is not directly injected into the input mixture, after a volume of the input mixture is introduced into the storage vessel. As will be described, in one embodiment, after an initial volume of the input mixture is introduced into the storage vessel, one or more additional volumes of the input mixture may subsequently be introduced into the storage vessel. It is believed that these additional volumes of the input mixture add thermal energy to the accumulated total of the volumes of the input mixture that are held in the storage vessel. In this way, thermal energy may be indirectly added to the mixture that is already in the storage vessel.

In one embodiment, the input mixture has an input ammonium-N concentration of approximately 12,550 mg/kg, and the output mixture has an ammonium-N concentration of at least approximately 28,990 mg/kg. This represents an increase from the ammonium-N concentration of the input mixture. Accordingly, this indicates that the input mixture continued to be subjected to hydrolysis while in the storage vessel, and while also substantially simultaneously subjected to anaerobic digestion.

It will be understood that, after the volume of the input mixture has been subjected to anaerobic digestion and hydrolysis for a selected time period, the input mixture has been partially processed in the storage vessel, to form a volume of an intermediate mixture in the storage vessel. Preferably, one or more additional volumes of the input mixture are added to the volume of the input mixture that is already in the storage vessel (i.e., the intermediate mixture). It will be understood that such additional volumes may be added to the intermediate mixture in batches, from time to time. Alternatively, the additional volumes may be added continuously, e.g., commencing shortly after the initial volume of the input mixture is introduced into the storage vessel.

As noted above, the enhanced biosolids may be produced from one or more processes in which alkali and thermal energy are input, to increase the rate of hydrolysis, e.g., the Lystek process. Those skilled in the art would appreciate that the additional volumes of the input mixture that are added to the intermediate mixture, and which include the enhanced biosolids, also include additional alkali and residual thermal energy, i.e., such thermal energy being residual from the thermal energy inputs from the process that produced the additional volumes of the input mixture.

It is believed that the additional amounts of the input mixture contribute to the hydrolyzing process in the storage vessel, at least because of the additional alkali and the residual thermal energy in the additional volumes when such additional volumes are introduced into the storage vessel. It is also believed that, when the additional volume of the input mixture is combined with the volume of the intermediate mixture in the storage vessel, the additional alkali and the residual thermal energy of the additional input mixture are diffused into the intermediate mixture.

To some extent, when an additional volume of the input mixture is introduced into the storage vessel, such additional volume and the intermediate mixture already in the storage vessel may be mixed together, due to the momentum of the additional volume when it is introduced. Such mixing may be partially due to convection, or diffusion. Also, because biogas is released during anaerobic digestion, the movement of the biogas upwardly through the mixture in the storage vessel may also assist, to an extent, in mixing the mixture.

Figure 2:
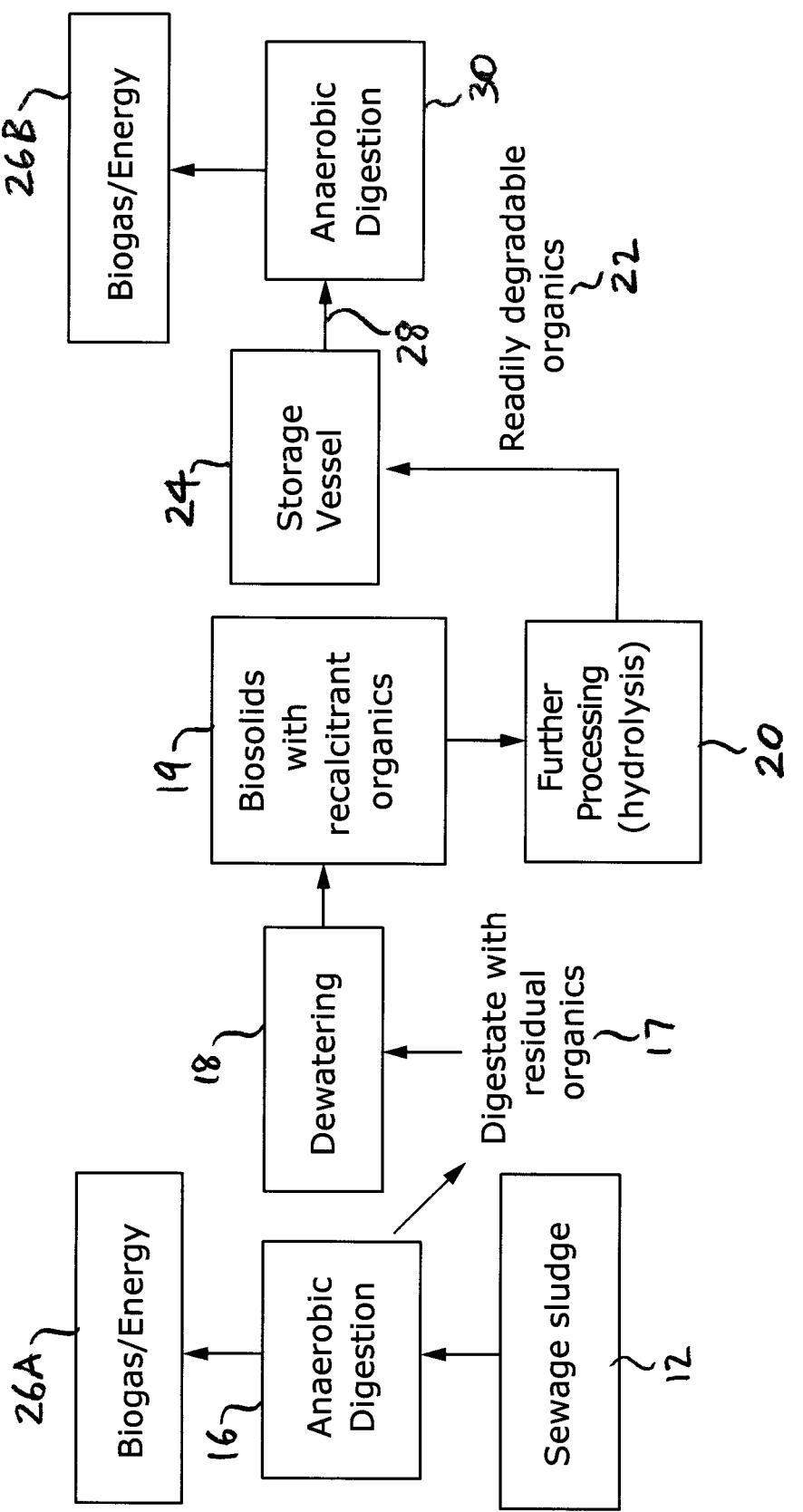
FIG. 2 is a schematic illustration showing another embodiment of the method of the invention.

In an alternative embodiment of the invention, upon exiting the storage vessel, the output mixture preferably is directed to an anaerobic digester, as illustrated in FIG. 2. Preferably, the anaerobic digester to which the output mixture is directed is also located in the municipal wastewater treatment plant. Alternatively, the output mixture may be directed to another digester located elsewhere.

The storage vessel may be located in the municipal wastewater treatment plant. As noted above, it is advantageous if the storage vessel is located in the municipal wastewater treatment plant, because the enhanced biosolids and the output mixture would in that case not have to be transported outside of the municipal wastewater treatment plant. However, it will be understood that the storage vessel may, alternatively, be located outside the municipal wastewater treatment plant.

It is believed that the effect of the anaerobic digestion in the storage vessel, and the additional time in which hydrolysis is allowed to take place in the storage vessel, is that the proportion of the organic or volatile solids fraction of biosolids in the mixture is substantially decreased, relative to the biosolids content of the input mixture. Accordingly, when the output mixture is introduced into the anaerobic digester in the municipal wastewater treatment plant, it has a decreased biosolids content.

A typical analysis of enhanced biosolids that have been subjected to the Lystek process (i.e., the input mixture) is shown in Table 1.

TABLE 1

Typical analysis of further processed (partially hydrolyzed) biosolids

| Parameters | Value |
| --- | --- |
| Total solids (%) | 13-16 |
| Volatile solids (% of TS) | 55-60 |
| Total Organic Carbon (%) | 26-28 |
| Organic matter (%) | 45-50 |
| Total COD (mg/L) | 105,000-150,000 |
| Soluble COD (mg/L) | 40,000-60,000 |
| RbCOD (mg/L) | 25,000-30,000 |
| Volatile Fatty Acids (mg/L) | 10,000-15,000 |
| Viscosity (cP) | 4,000-6,000 |

Soluble chemical oxygen demand (COD) and volatile fatty acids (VFA) are important parameters in relation to the presence of highly biodegradable or digestible organic fractions of the biosolids and producing biogas by methanogenic microorganisms under anaerobic digestion conditions. That is, higher soluble COD and higher VFA levels indicate that more biogas (e.g., methane) is likely to be produced, when the enhanced biosolids are subjected to anaerobic digestion. The data in Table 1 indicates high levels of soluble CODs and VFAs in the enhanced biosolids.

The output mixture may be added into a biological nutrient removal system in the municipal wastewater treatment plant, for utilization of the output mixture as a carbon source in the biological nutrient removal system.

From the foregoing, it can be seen that the enhanced biosolids are subjected to continued hydrolysis while the intermediate mixture is in the storage vessel. The hydrolysis is believed to continue because of the presence of the alkali in the input mixture, and also due to residual heat from the further processing (e.g., the Lystek process), while the mixture is subjected to anaerobic digestion conditions in the storage vessel. Accordingly, while continuous thermal and chemical hydrolysis takes place in the storage vessel, anaerobic digestion and biogas generation also occur simultaneously with the hydrolysis, under suitable anaerobic conditions in the storage vessel.

The biogas composition recovered from two storage vessels is provided in Table 2.

TABLE 2

Biogas composition recovered from full scale storage vessels under suitable conditions

| Biogas components (%) | Vessel 1 | Vessel 2 |
| --- | --- | --- |
| Methane % | 36-71 | 58-62 |
| $CO_2$ % | 9-39 | 34-42 |

Typical parameters of the enhanced biosolids (i.e., the input mixture) and the output mixture can be seen in Table 3.

TABLE 3

Typical total solids, volatile solids and ammonia concentration of the enhanced biosolids from the reactor, and storage vessel

| Lystek Biosolid material | Total solids (%) | Volatile solids (%) | Volatile solids (% of total solids) | Inert solids (% of total solids) | Ammonium-N (mg/kg) |
| --- | --- | --- | --- | --- | --- |
| Reactor material | 14.5 | 8.3 | 57.2 | 42.8 | 12,550 |
| Storage vessel material | 12.1 | 6.1 | 50.4 | 49.6 | 28,900 |

From the foregoing, it can be seen that during the predetermined time period in which the input mixture is stored in the storage vessel, total solids and volatile solids decrease, and ammonium-N concentration increases, which are direct indicators confirming that hydrolysis continues while the input mixture is in the storage vessel.

It has been found that the output mixture is relatively easily pumpable with a high solids content. The output mixture may be transported using conventional liquid handling equipment, and stored as a liquid.

The storage vessel also may be used to establish and acclimatize anaerobic cultures, to facilitate digestion of enhanced biosolids in alternate applications.

Storing the enhanced biosolids in the storage vessel for the predetermined time period has the additional benefits that pathogenic bacteria such as fecal coliforms and *Salmonella* are eliminated. Standards for fecal coliforms and *Salmonella* provided in the United States Environmental Protection Agency biosolids regulatory criteria, and also in the Canadian Food Inspection Agency fertilizer regulations for treated biosolids and fertilizer products created from municipal or sewage wastewater biosolids, are satisfied by the output mixture.

The storage vessel may be any suitable vessel, and preferably is adapted for capturing the biogas generated due to anaerobic digestion. Surprisingly, it appears that energy inputs (e.g., for thermal energy, or for mixing) are unnecessary. Also, unlike the usual practices related to conventional anaerobic digestion, it does not appear that monitoring or close control of temperature and pH in the storage vessel is required.

In use, the initial volume of the input mixture is introduced into the storage vessel. As described above, in the storage vessel, the input mixture is subjected to anaerobic digestion, and hydrolysis. In one embodiment, it is preferred that additional volumes of the input mixture are introduced into the storage vessel continuously, or substantially continuously. However, in contrast to the usual practices involving anaerobic digesters, it is preferred that the output mixture is not drawn from the storage vessel continuously, or substantially continuously. Instead, it is preferred that the output mixture is drawn from the storage vessel in batches, from time to time, as needed. Advantageously, this means that the mixture that is in the storage vessel can be subjected to anaerobic digestion and to hydrolysis for an extended period of time, if required.

In FIG. 1, an embodiment of the invention is schematically illustrated. As can be seen in FIG. 1, the further processing to produce the enhanced biosolids (e.g., utilizing the Lystek process) takes place at step 20. Upstream from step 20 is the step of dewatering 18 of input to the dewatering step, namely, undigested sewage sludge 12, aerobic digestion 14, and anaerobic digestion 16. The anaerobic digestion 16 and the aerobic digestion 14 produce a digestate with residual organics (identified by reference character 17 in FIG. 1), which may be subjected to the dewatering step 18. It will be understood that all of steps 12, 14, 16, and 18 may take place inside the municipal wastewater treatment plant. The step of further processing the biosolids cake 20 may also take place within the municipal wastewater treatment plant.

As can be seen in FIG. 1, the further processing step 20 produces readily degradable organics 22 (i.e., the enhanced biosolids referred to above, also referred to as the input mixture), which are directed to the storage vessel 24 in which the enhanced biosolids are subjected to anaerobic digestion and additional hydrolysis, as outlined above. One of the products of the anaerobic digestion in the storage vessel 24 is biogas or energy (i.e., from combustion of the biogas), identified by reference character 26. As described above, the output mixture (not shown in FIG. 1) may be utilized, e.g., in the anaerobic digestion 16 in the municipal wastewater treatment plant. As illustrated in FIG. 1, the anaerobic digestion 16 in the municipal wastewater treatment plant may also provide biogas.

An alternative method of the invention is illustrated in FIG. 2. In FIG. 2, the sewage sludge 12 is subjected to anaerobic digestion 16 in the municipal wastewater treatment plant. Biogas or energy 26A is produced by the anaerobic digestion 16. Digestate with residual organics 17 is also produced by the anaerobic digestion 16. The digestate with residual organics 17 is subjected to dewatering 18, resulting in the biosolids cake 19, which includes some recalcitrant organics (i.e., organics that are resistant to biodegradation, and the fraction of inert biosolids). The biosolids cake 19 is subjected to further processing (i.e., hydrolysis, including, e.g., the Lystek process) 20, to produce enhanced biosolids (i.e., readily degradable organics) 22 that are directed to the storage vessel 24. In this process, the output mixture 28 may be subjected to further anaerobic digestion 30, to produce, among other things, biogas or energy 26B.

It will be appreciated by those skilled in the art that the invention can take many forms, and that such forms are within the scope of the invention as claimed. The scope of the claims should not be limited by the preferred embodiments set forth in the examples, but should be given the broadest interpretation consistent with the description as a whole.

We claim:

1. A method of processing enhanced biosolids from a wastewater treatment plant to produce an output mixture, the method comprising:
   (a) providing at least one volume of an input mixture having an input mixture viscosity, the input mixture being at an input temperature between 75° C. and 85° C., the input mixture comprising:
      (i) the enhanced biosolids having been subjected to shear forces and mixed in a mixing vessel, the enhanced biosolids being partially hydrolyzed biosolids comprising an input solids content between 4% and 16% by weight of the input mixture;
      (ii) sufficient process liquid to result in the output mixture having an output solids content between 3% and 13% by weight of the output mixture; and
   (b) storing the input mixture in a storage vessel in which the input mixture is subjected to anaerobic conditions and hydrolysis over a predetermined time period, to form the output mixture having the output solids content between 3% and 13% by weight of the output mixture, the output mixture having an output mixture viscosity that is less than the input mixture viscosity.

2. A method according to claim 1 in which the predetermined time period is at least 60 days.

3. A method according to claim 2 in which the predetermined time period is at least 90 days.

4. A method according to claim 1 in which the input mixture has an input ammonium-N concentration of 12,550 mg/kg, and the output mixture has an ammonium-N concentration of at least 28,990 mg/kg.

5. A method according to claim 4 additionally comprising:
   (c) after said at least one volume of the input mixture has been subjected to anaerobic digestion for a selected time period to form a volume of an intermediate mixture in the vessel, adding at least one additional volume of the input mixture to said volume of the intermediate mixture in the vessel.

6. A method according to claim 1 in which, upon exiting the vessel, the output mixture is directed to at least one anaerobic digester, said at least one anaerobic digester being located in the wastewater treatment plant.

7. A method according to claim 1 in which the output mixture is directed to a biological nutrient removal system in the wastewater treatment plant, for utilization of the output mixture as a carbon source in the biological nutrient removal system.

\* \* \* \* \*